Oct. 29, 1940.  G. C. R. KUIPER  2,219,689

VEHICLE BRAKE

Filed May 9, 1936   5 Sheets-Sheet 1

INVENTOR.
GERHARD G.R. KUIPER
BY
ATTORNEY.

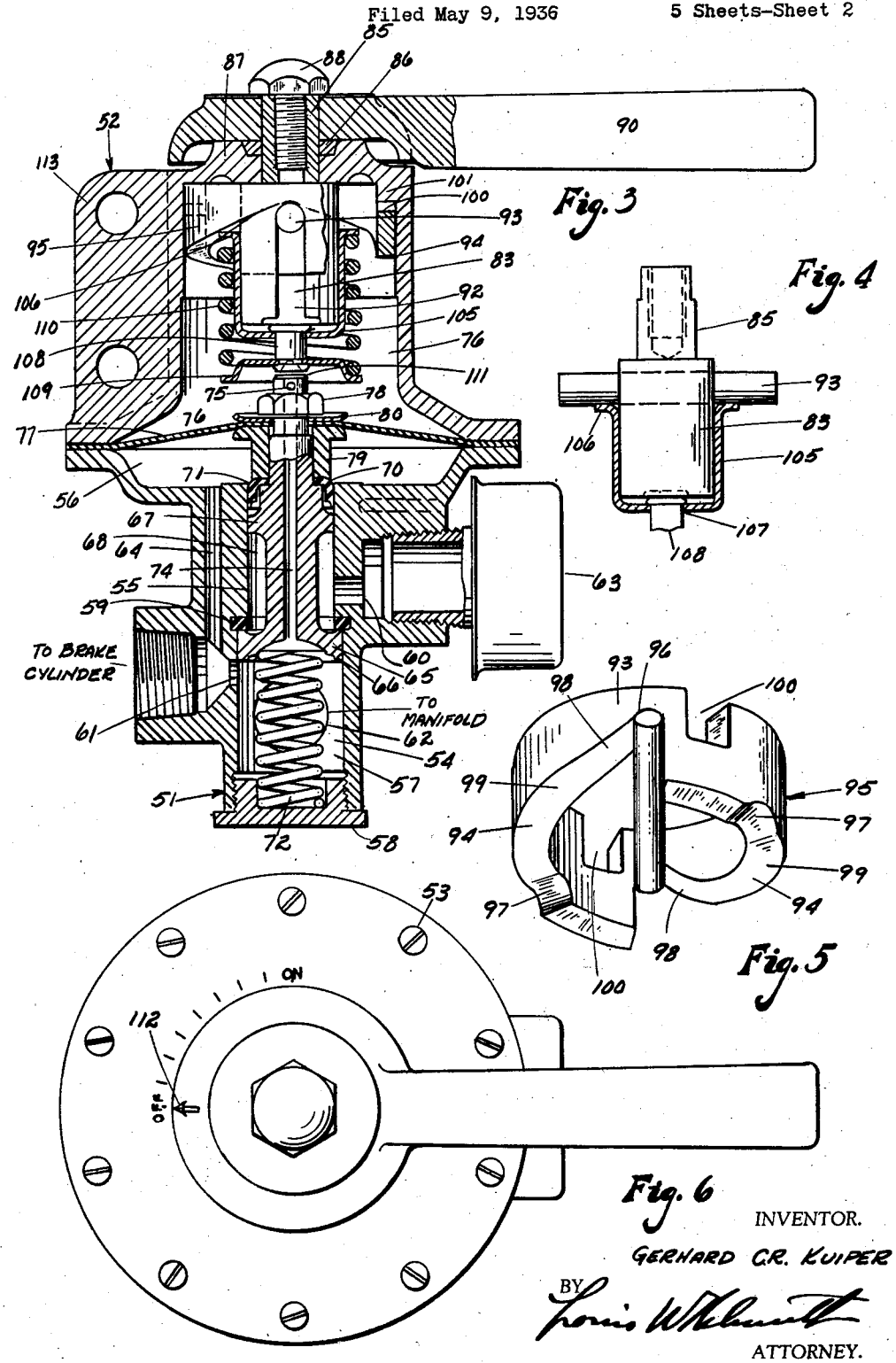

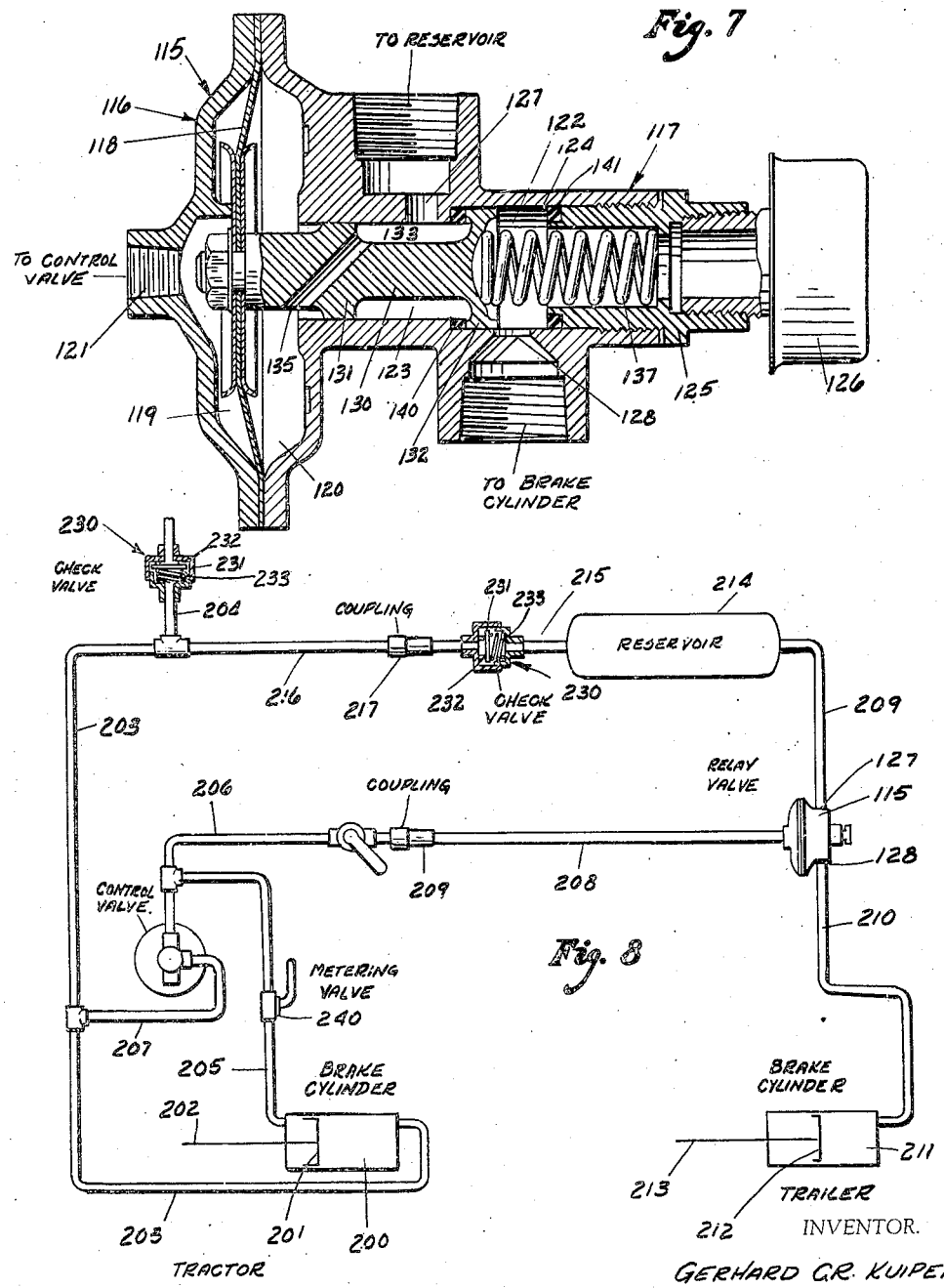

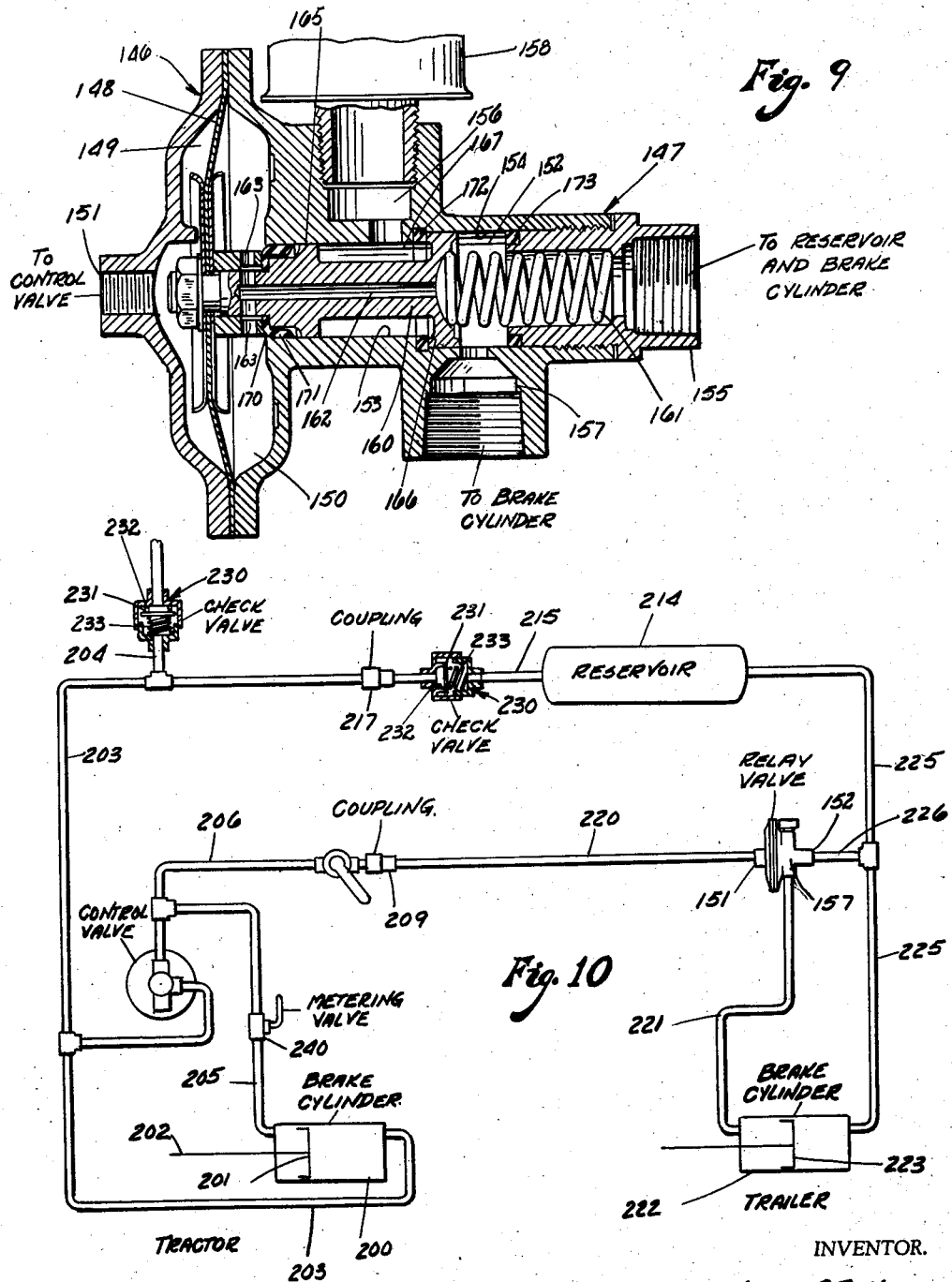

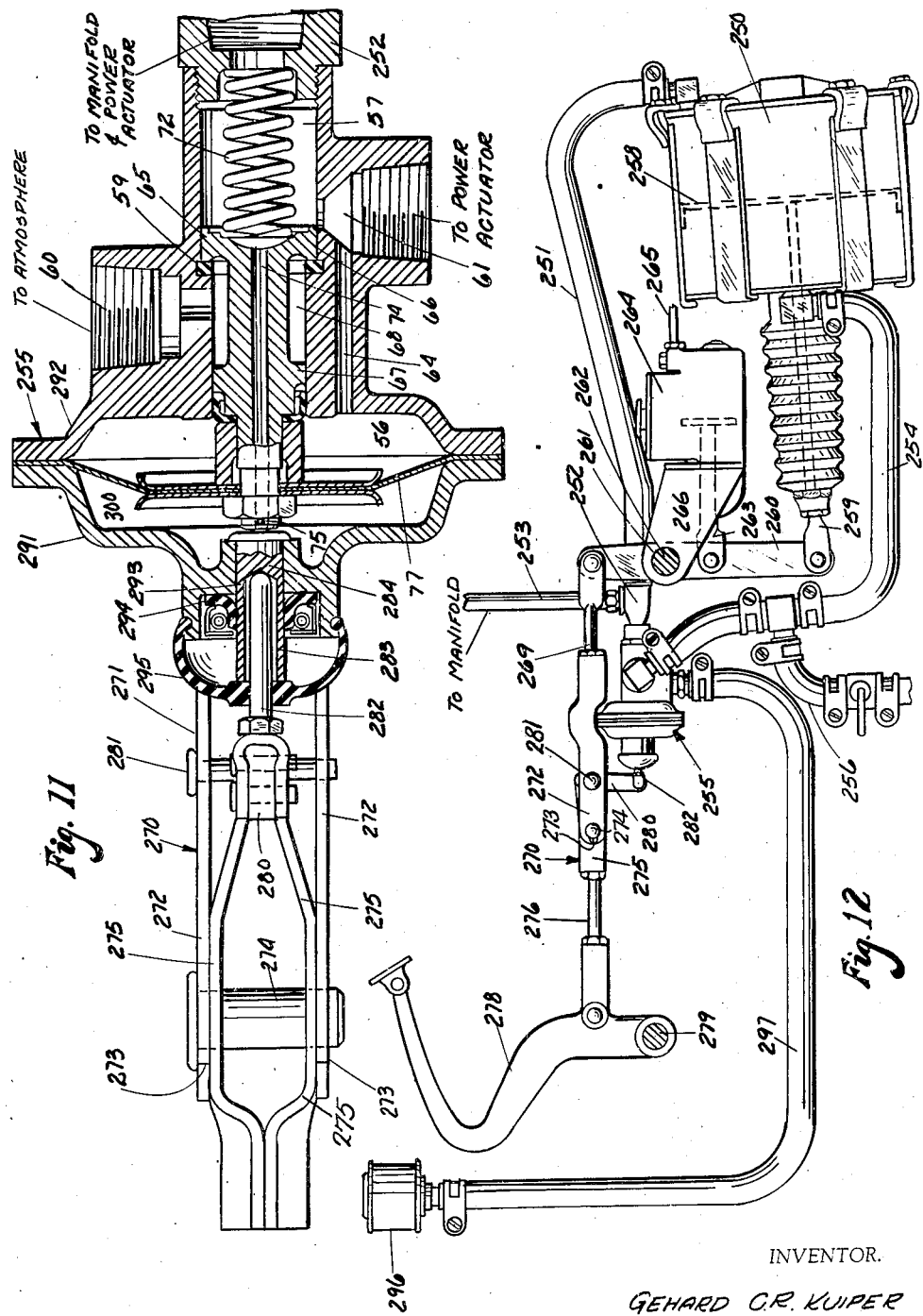

Patented Oct. 29, 1940

2,219,689

UNITED STATES PATENT OFFICE 2,219,689

VEHICLE BRAKE

Gerhard C. R. Kuiper, Cleveland, Ohio, assignor to The Midland Steel Products Company, Cleveland, Ohio, a corporation of Ohio Application May 9, 1936, Serial No. 78,870

8 Claims. (Cl. 188—3)

This invention relates to new and useful improvements in vacuum operated brake mechanisms.

An object of the invention is to provide a highly sensitive reaction compensating type of control valve, which, under certain conditions automatically teeters between "on" and "lapped" positions to temper or modulate applications of the brake mechanism.

Another object of the invention is to provide a valve mechanism normally submerged in vacuum to maintain the valve in balanced position when in off position.

A further object of the invention is to provide a valve mechanism wherein during braking, one side of the valve is at all times subjected to vacuum and the other side to atmosphere thereby providing a differential pressure, which resists the efforts of the operator to apply the brakes, and the resistance varies substantially with the differential pressure acting upon the valve to thereby enable the operator to gauge the extent to which the brakes are being applied.

Another object of the invention is to provide a hand control valve mechanism whereby the desired braking pressure may be applied to the brakes by manipulating a hand operated lever to positions representing different degrees of brake application.

Another object of the invention is to provide a brake system in which hydraulic brakes are initially actuated by power means, and subsequently by manual means.

Another object of the invention is to provide a relay valve for combined tractor-trailer braking systems, for automatically applying the trailer brakes if the latter separates from the tractor, and seals the vacuum reservoir to thereby maintain the trailer brakes in brake applied position.

A further object of the invention is to provide auxiliary valve means to control the degree of tractor brake application without interfering with the operation of the trailer brakes to prevent so-called overrunning of the tractor-trailer unit.

Another object of the invention is to provide a normally open check valve which is closed only upon a sudden inrush of air to prevent accidental application of the brakes.

Other objects and advantages of the invention will become apparent during the course of the following description.

In the accompanying drawings forming a part of this application and wherein like numerals are employed to designate like parts throughout the several views:

Fig. 3 is a sectional view of a hand control valve,

Fig. 4 is an elevational view of a portion of the hand control valve,

Fig. 5 is a perspective view of the cam means employed in the hand control valve, Fig. 6 is a plan view of Fig. 3, Fig. 7 is a sectional view of one form of relay valve, Fig. 8 illustrates a tractor-trailer brake hook-up, Fig. 9 is a sectional view of another form of relay valve, Fig. 10 illustrates another form of tractor-trailer brake hook-up, Fig. 11 is a horizontal sectional view partly in plan of another form of foot control-valve, and Fig. 12 is an elevational view illustrating an installation of the valve shown in Fig. 11 for operating brakes either by power or mechanically.

Figure 1:
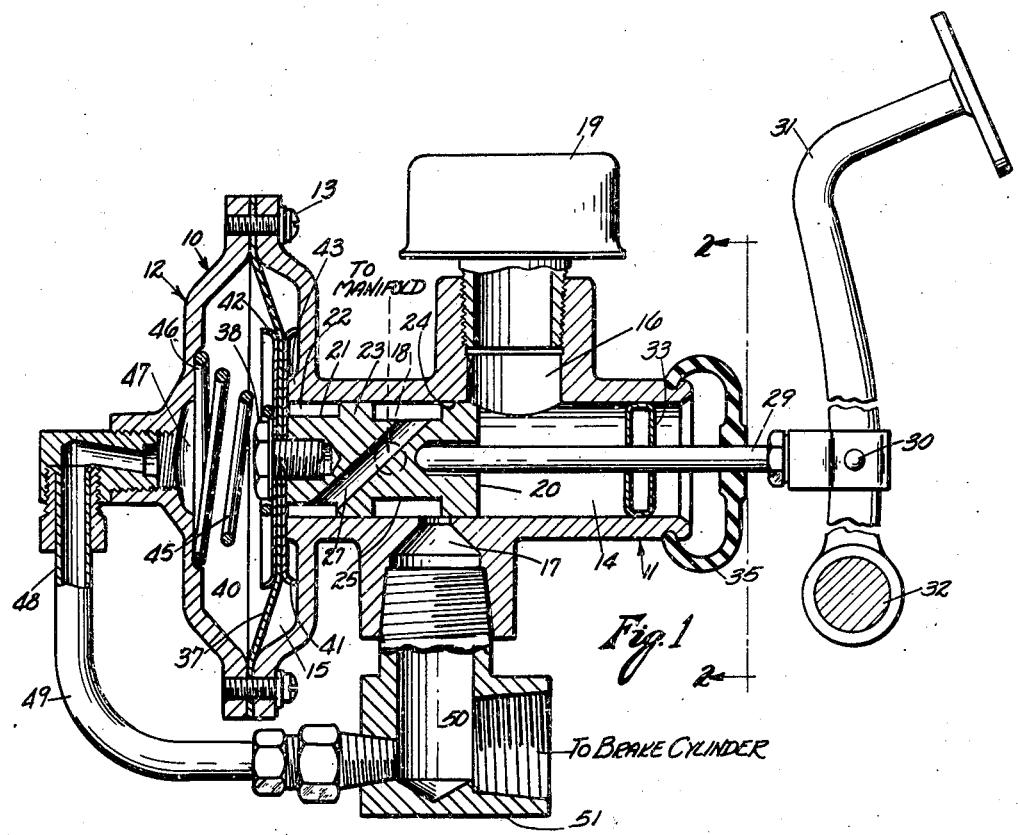
Fig. 1 is a sectional view of a foot control valve.
Figure 2:
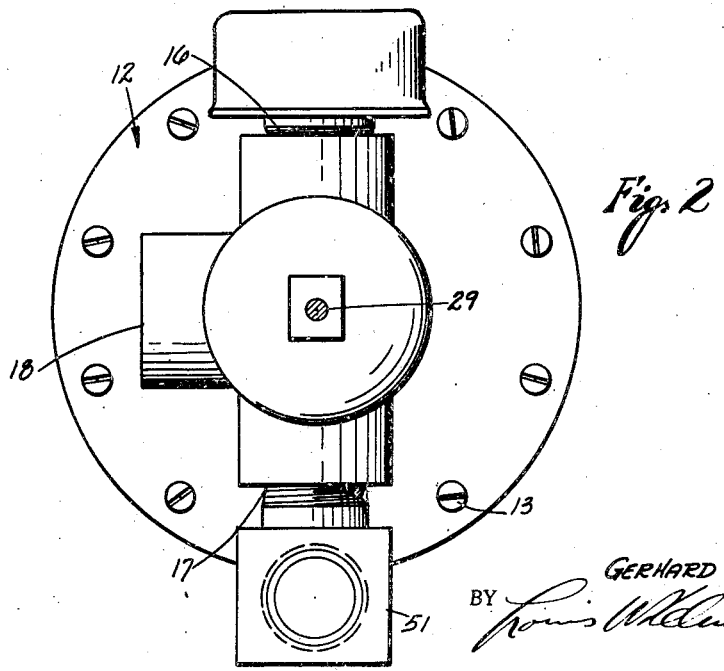
Fig. 2 is an end elevational view taken on line 2—2 of Fig. 1.

Referring now more particularly to Figs. 1 and 2, the numeral 10 designates a foot control valve composed of two valve housing sections 11 and 12 secured together by screws 13. The section 11 is provided with lateral ports 16, 17 and 18 communicating with an axially extending bore 14 terminating at its inner end in an enlarged chamber 15. The port 16 communicates with the atmosphere through a breather or air cleaner 19, and the port 17 is adapted to communicate with a brake or power cylinder hereinafter described, while the port 18 is adapted to be connected with the intake manifold of an internal combustion engine for its source of suction or partial vacuum.

Reciprocally mounted in the bore 14 is a piston type valve 20 having a reduced cylindrical end portion 21 to provide a recess 22 therebetween and the bore 14 which communicates with the enlarged chamber 15 The valve 20 is further provided with spaced annular closure or valve members 23 and 24 which define an annular recessed portion 25 of sufficient length to extend clear of the manifold port 18 and the brake cylindrical port 17 so that the ports 17 and 18 are in communication with each other as shown in Fig. 1. A port 27 extends laterally through the piston valve 20 to provide communication between the end recess 22 and the middle recess 25. The outer end of the piston valve 20 has an axial cavity for the loose reception of an actuating stud or valve stem 29 which extends beyond the bore 14 and is pivotally connected at 30 to a foot pedal 31 fulcrumed on a rod 32 suitably supported on the motor vehicle. A bearing member 33 suitably supports the valve stem 29 in the bore 14. A rubber boot 35 has one end seated in a groove around the valve casing section 11 and the other end is disposed about the valve stem 29 to exclude extraneous matter from the bore 14.

A diaphragm 37 is rigidly secured to the inner extreme end of the piston valve 20 by means of a screw 38 and its marginal edge is secured between the housing sections 11 and 12 by means of the screws 13. The valve housing section 12 cooperates with the diaphragm 37 to form a diaphragm chamber 40. Relatively large washers 41 and 42 are arranged on opposite sides of the diaphragm 37, the washer 41 engaging an annular flange 43 at the end of the bore 14 to limit movement of the diaphragm 37 and prevent damage to the same when the valve is in the position shown in Fig. 1. A conical spiral spring 45 surrounding the screw 38 seats at its small end against the washer 42 and the larger end of the spring is disposed in a seat 46 formed in the valve housing section 12, and one function of the spring 45 is to normally urge the piston valve 20 to off position as shown in Fig. 1.

To communicate the diaphragm chamber 40 with the brake cylinder port 17, the valve housing section 12 is provided with an axial port 47 in which is suitably connected an end 48 of a conduit 49 which has its other end terminating in a bore 50 of a nipple 51 communicating with the brake cylinder port 17.

From the foregoing it will be seen that the diaphragm chamber 15 communicates with a source of vacuum through the recess 22, lateral piston valve port 27, recess 25 and the vacuum port 18, while the diaphragm chamber 40 is connected to the source of suction by means of the conduit 49, nipple port 50, brake cylinder port 17, recess 25 and vacuum port 18. In other words, the diaphragm 37 is submerged or balanced in vacuum when the piston valve 20 is in neutral or off position which corresponds to brake release position. At the same time, air enters the bore 14 through the atmospheric port 16 at the rear end of the piston valve 20, so that atmospheric pressure is exerted on the latter which pressure is opposed and normally overcome by the conical spring 45.

This control valve may be employed in the vacuum suspended tractor brake system shown in Fig. 8 which comprises a vacuum suspended power actuator or brake cylinder 200 closed at both ends and is provided with a piston 201 having a stem 202 adapted for connection with the brake rigging of the tractor. The rear end of the brake cylinder is connected to a pipe 203 communicating with a manifold pipe 204 adapted for connection to the intake manifold of the internal combustion engine (not shown) of the tractor, and the front end of the brake cylinder is connected to a conduit 205 leading to a pipe 206 connected with the brake cylinder port 17 of the control valve which has its manifold port 18 in open communication with a pipe 207 connected to the pipe 203 leading to the source of suction. It will be noted that the diaphragm 37 is submerged in vacuum and that the diaphragm chambers 15 and 40 are in communication with the front end of the brake cylinder when the tractor brakes are in released position.

When it is desired to apply the tractor brakes the operator depresses the foot pedal 31 causing the piston 20 to move against the tension of the spring 45, and the closure valve 24 is moved past the brake cylinder port 17, whereby suction is cut off to the latter and consequently to the front end of the brake cylinder 200 and to the diaphragm chamber 40. This places the atmospheric port 16 in communication with the brake cylinder port 17 whereby air is admitted to the diaphragm chamber 40 through the conduit 49 subjecting the diaphragm 37 to a differential pressure, and the air is also admitted to the front end of the brake cylinder 200 subjecting the brake piston 201 to a differential pressure. The differential pressure in the brake cylinder 200 causes the brake piston 201 to move toward the rear of the brake cylinder to apply the brakes, while at the same time the differential pressure in the diaphragm chambers exerts a pressure against the diaphragm 37 which tends to move the piston 20 to brake release position in opposition to the direction of force applied to the brake pedal by the operator's foot. It will be noted that the differential pressure in the diaphragm chambers opposing the pedal pressure is caused by the air pressure in the diaphragm chamber 40 which is equal to the air pressure in the forward end of the brake cylinder 200, and by the fact that the diaphragm chamber 15 contains a vacuum at all times which tends to pull the diaphragm 37 in a direction opposite to the brake applying movement of the brake pedal. The differential pressure in the diaphragm chambers tends to move the piston 20 to lap position upon slight retraction of the brake pedal 31, and in lap position the closure valve 24 spans the brake cylinder port 17 to cut off the source of vacuum and atmosphere so that the brakes can be held in applied position as long as desired. As soon as the foot pressure is removed from the brake pedal 31, the spring 45 moves the piston 20 from applied to release position, whereupon atmospheric air will be cut off and the diaphragm chamber 40 and forward end of the brake cylinder 200 will again be connected to the manifold thereby permitting the brake piston 201 to be returned to normal position releasing the brakes, under the normal action of the usual brake retractor springs.

Figs. 3 through 6 disclose a hand control valve adapted to be employed in the tractor brake system shown in Fig. 8 and comprises a valve housing composed of sections 51 and 52 secured together by screws 53. The lower section 51 is provided with an axially extending bore having a reduced portion 55 terminating in an enlarged diaphragm chamber 56, and having an enlarged portion 57 closed by a removable plug 58. At the shoulder formed by the reduced portion 55 of the bore 54 is an annular recess in which is disposed a packing ring 59 having its inner peripheral surface in line with the surface of the reduced bore 55 and having a part of its flat surface displaced with respect to the enlarged bore 57. Extending laterally in the housing 51 and communicating with the axial bore 54 are ports 60, 61 and 62, the port 60 leading to the atmosphere through a breather or air cleaner 63, and the port 61 adapted to communicate with the conduit 205 leading to the brake cylinder 200 while the port 62 is adapted to be connected to the conduit 207 leading to the intake manifold of an internal combustion engine for its source of suction or partial vacuum. The brake cylinder port 61 communicates with one end of a longitudinal passage 64 in the lower housing 51 and this passage communicates with the diaphragm chamber 56 to thereby at all times maintain the latter in communication with the front end of the brake cylinder 200.

Reciprocally mounted in the bore 54 is a piston type valve 65 provided at its outer end with an enlarged annular closure or valve 66 which intimately engages the enlarged bore 57, and is provided adjacent its opposite end with an annular closure or valve 67 which snugly engages the reduced bore 55. The annular closures 66 and 67 define an annular recess 68 which at all times spans the atmospheric port 60 irrespective of the position of the piston valve 65. Disposed about the piston valve 65 is an inverted cup-shaped packing 70 having its depending flange 71 extending toward the closure member 67 so that it will be distended into fluid tight engagement with the reduced bore 55 by the atmosphere that might leak past the closure member 67. The piston valve is normally held in off position, as shown in Fig. 3, which represents release position of the hand control valve, by means of a spring 72 interposed between the piston valve 65 and the removable plug 58, the spring 72 also holds the closure member 66 in fluid tight relation against the packing ring 59.

Extending longitudinally of the piston valve 65 is a passage 74 which communicates at one end with the enlarged bore 57 and at the opposite end with lateral ports 75 at all times in communication with a diaphragm chamber 76 formed by a diaphragm 77 and the upper valve housing 52. The diaphragm is rigidly secured to the piston valve 65 by a nut 78 and has its marginal edge clamped between the housing sections 51 and 52 by means of the screws 53. Washers 79 and 80 are arranged on opposite sides of the diaphragm 77 to provide a bearing surface for the diaphragm 77, and the washer 79 secures the packing 70 to the piston valve 65.

In order to operate the piston valve 65 a valve actuating mechanism is disposed within the upper chamber 76. Within this chamber is a sleeve 83, shown in detail in Fig. 4, and has a stem 85 which rotatably extends through a central aperture 86 in the top 87 of the valve housing 52 and secured to the stem 85, by means of a screw 88, is an operating handle 90. The handle 90 is provided with a pointer 112 movable over a series of indications on top of the housing 52 each of which represents a braking position of the control valve. A bracket 113 integral with the housing 52 facilitates mounting of the control valve to the dash board or steering column of the tractor. A transverse slot 92 is provided in the enlarged portion of the sleeve 83 for the slidable and rotatable reception of a cam pin 93 which engages the cam faces 94 of a cam 95 as shown in detail in Fig. 5.

Each of the cam faces is provided with a release pocket 96 in which the cam pin 93 rests when the valve is in released position, and a pocket 97 in which the cam pin 93 is locked when the valve is in fully applied position. The grade of each cam face 94 is relatively steep adjacent the release pockets 96 as shown at 98, so as to quickly move the valve mechanism to its initial operating position, the grade then becomes gradual as indicated at 99 whereby the valve is gradually moved to fully applied position. In order to prevent rotation of the cam 95 the latter is provided with diametrically opposed slots 100 which fit over studs 101 depending integrally from the top wall of the housing, and the slots 100 are of greater depth than the studs 101 to permit insertion of a suitable hook in the space therebetween for removal of the cam 95 from the housing 52.

Loosely disposed about the sleeve 83 is a cup-shape spring retainer 105 provided with an annular flange 106 upon which the cam pin 93 rests, and the spring cup 105 has an axial opening 107 in which is slidably mounted a pin 108 to which is rigidly secured a disc 109. Interposed between the flange 106 and the disc 109 is a spring 110 which holds the pin 108 in abutment against the extreme end 111 of the piston valve 65 as shown in Fig. 3.

This hand control valve may be employed in the vacuum suspended tractor brake system illustrated in Fig. 8 and when so-embodied the front end of the brake cylinder 200 is connected to the manifold by means of the conduits 205 and 206, control valve ports 61 and 62 and conduits 207, 203 and 204. The diaphragm 77 is normally suspended in vacuum since the chamber 76 is at all times connected to the source of vacuum through the lateral ports 75, passage 74, port 62 and conduits 207, 203 and 204. And the lower chamber 56 is connected to the source of vacuum when the valve is in off position by means of the passage 64, ports 61 and 62 and the conduits 207, 203 and 204.

To operate the control valve the hand lever 90 is rotated from off position toward fully on position which rotates the cam sleeve 83 causing the cam pin 93 to move out of the release pockets 96 along the steep grade 98 of the cam surface. And since the cam pin 93 slides along the flange 106 of the spring cup 105, the latter is shifted relatively to the pin 108 to compress the spring 110 whereby the pin 108 exerts pressure against the piston 65 and overcomes the opposing force of the spring 78 to shift the piston 65 to a brake applied position corresponding to that indicated by the pointer 112.

In this brake applied position the closure valve 66 covers the vacuum port 62 and exposes the brake cylinder port 61 so as to communicate with the atmosphere through port 60 and breathers 63. Consequently air is admitted to the front end of the brake cylinder 200 and since the rear end of the latter is in vacuum the piston 201 will be subjected to differential pressures and will move to the right, as viewed in Fig. 8, to operate the tractor wheel brakes.

It should be noted that when piston 65 is in brake applied position the diaphragm chamber 56 also communicates with atmosphere through the passage 64, port 61, recess 68 and port 60, so that the lower surface of the diaphragm 77 is subjected to atmospheric pressure at the same time that the front end of the brake cylinder 200 is also subjected to atmospheric pressure. In other words, the pressure at the front of the brake cylinder 200 is substantially equal to that in the lower diaphragm chamber 56. At the same time the upper surface of the diaphragm 77 remains subjected to a partial vacuum since the chamber 76 at all times communicates with the vacuum port 62 the lower portion of which is not closed off to the source of vacuum when piston 65 is in brake applying position. Accordingly, the vacuum in chamber 76 and the air pressure in chamber 56 combine to urge the diaphragm 77 in an upward direction against the force of the spring 110 and tends to shift the piston 65 to lap position without movement of the handle 90. And when the piston 65 is in lap position the closure member 66 spans the brake port opening 61 to cut off communication of atmosphere and vacuum to the brake cylinder 200 to thereby hold the tractor wheel brakes in brake applied position. If full braking pressure is desired the handle 90 is rotated to fully applied position in which position the cam pin 93 rests in the pockets 97 on the cam 95 and holds the handle 90 in this position.

Accordingly, it is seen that the operating handle 90 can be rotated to the desired braking position indicated on the dial to obtain the desired braking pressure at the tractor wheel brakes.

To release the brakes the handle 90 is shifted to off position whereby the springs 72 and 110 together with the differential pressure on diaphragm 77 operate to immediately move the piston 65 to off or normal position.

This hand control valve is also capable of controlling an air suspended brake cylinder, in which the brake piston is suspended in air, without any change in the valve structure, it being only necessary to reverse the "on" and "off" positions with respect to the pointer 112. When so modified that portion of conduit 203 between the pipe 207 and the rear of cylinder 200 is eliminated, the conduit 205 is disconnected from the front end of cylinder 200 and is connected to the rear end of cylinder 200, and the front end of the latter is exposed to atmosphere, and the piston 65, will, when in off position, uncover the brake cylinder port 61 to the breather 63 and the cam pin 93 will be locked in the pockets 97 to suspend the piston 201 in air. Upon operation the handle 90 will be rotated in the reverse direction and the piston 65 will move upwardly, as viewed in Fig. 3, to interrupt flow of air to the brake cylinder port 61 and uncover the manifold port 62 whereby the latter communicates with the rear end of the brake cylinder 200 to operate the tractor brakes.

The foregoing tractor brake system may be coupled to an air suspended trailer brake system shown in Fig. 8 as comprising a conduit 208 connected by coupling 209 to the pipe 206 of the tractor brake system and the opposite end of the conduit 208 is connected to a port 121 of a relay valve 115 shown in Fig. 7 which has ports 127 and 128 respectively connected to conduits 209 and 210, the latter communicating with the rear end of a brake cylinder 211 the opposite end of which communicates with atmosphere. And reciprocally disposed in the brake cylinder 211 is a piston 212 provided with a stem 213 adapted for connection with the brake mechanism of the trailer. A vacuum reservoir 214 located on the trailer has one end connected to the conduit 209 and the opposite end is joined to a conduit 215 coupled to the tractor pipe 216 by means of a coupling 217.

The relay valve 115 employed in this trailer brake system comprises a main valve housing formed in two sections 116 and 117 secured together upon the marginal edge of a diaphragm 118 which divides the interior of the housing into two chambers 119 and 120. The valve housing section 116 is provided with the axial aperture 121 adapted to be connected to the conduit 208 of the trailer brake system whereby the chamber 119 normally contains vacuum. Extending longitudinally of the valve section 117 is a bore 122 having a reduced portion 123 and an enlarged portion 124, the reduced bore 123 terminates in the chamber 120 and the larger bore 124 is provided with a threaded sleeve 125 which is closed by a breather or air cleaner 126 communicating with the atmosphere. Lateral ports 127 and 128 communicate with the bore 122, the port 127 being adapted for connection with the conduit 209 leading to the vacuum reservoir 214 and the port 128 is adapted to be connected to the conduit 210 leading to the rear end of the air suspended brake cylinder 211.

Reciprocally mounted in the bore 122 is a piston type valve 130 provided with spaced annular closure members or valves 131 and 132 which define a recess 133 of sufficient length to at all times span the vacuum port 127. Extending transversely of the piston 130 is a passage 135 which at all times provides communication between the vacuum port 127, and the chamber 120, whereby the latter contains vacuum irrespective of the position of the piston 130. One end of the piston 130 is secured to the diaphragm 118 and is yieldably held in off position shown in Fig. 7 by a spring 137 interposed between the piston valve and the sleeve 125. The strength of the spring 137 is such that it will collapse when air is admitted to the chamber 119 which causes the piston 130 to move from off to brake applied position.

Means have been provided to prevent leakage of air past the closure member 132 when the piston is in brake release or applied positions and comprises annular packing or sealing rings 140 and 141. When the relay valve is in off position the closure member 132 engages the packing ring 140 to prevent leakage of air to the vacuum reservoir, and when the relay valve is in fully applied position the closure 132 is pressed against the sealing ring 141 to prevent leakage of air therepast to the vacuum reservoir and to the power actuator. In other words, the piston valve 130 can be disposed in fully brake applied position without fear that the vacuum in the power cylinder will be dissipated and render the brakes useless.

To operate the relay valve the control valve, whether hand or foot operated, is moved to brake applying position and atmosphere is immediately admitted to the diaphragm chamber 119. This creates a differential pressure on the diaphragm 118, since the chamber 120 is at all times in communication with the source of vacuum, and accordingly the diaphragm 118 and piston 130 is moved to the right as viewed in Fig. 7, to place the brake cylinder port 128 in communication with the manifold port 127 whereby the rear end of the brake cylinder 211 is exposed to vacuum which causes the piston 212 to move to the right as viewed in Fig. 8 and apply the trailer brakes. When the piston valve 130 is in brake applied position the annular closure 132 is disposed in sealing engagement with the packing ring 141 to prevent entrance of atmosphere from the breather 126, and consequently the degree of vacuum is not reduced.

In order to release the trailer brakes the operator controlled valve is moved to off position which interrupts the supply of air to the diaphragm chamber 119 and connects the latter to the source of vacuum, and the air entering the breather 126 moves the piston 130 to the position shown in Fig. 7 in which position the the brake port 128 is exposed to atmosphere and connects the rear end of the brake cylinder 211 with atmosphere to again suspend the brake piston 212 in air.

When the piston valve 130 is in off position the closure member 132 engages the packing 140 in air tight relation to prevent loss of vacuum in the reservoir 214 or leakage of vacuum therepast to the brake cylinder 211 whereby the atmospheric pressure therein is not rarified and the brakes are not accidentally applied.

Should the trailer accidentally separate from the tractor, air will be admitted into the trailer conduit 208 and thence into the diaphragm chamber 119 with consequent automatic brake application of the relay valve and of the trailer brakes, as will be understood. The trailer brakes are maintained in brake applied position for a considerable length of time after this accidental separation, because the packing 141 prevents entrance of atmosphere to the brake port 128 and to the vacuum reservoir 214 to thereby maintain the high degree of vacuum in the reservoir necessary to hold the trailer brakes in brake applied position.

Fig. 9 relates to another form of relay valve which may be employed in the vacuum suspended trailer brake system illustrated in Fig. 10 and herein shown connected to a tractor brake system alike in all respects to the tractor brake system shown in Fig. 8. This vacuum suspended trailer brake system comprises a conduit 220 connected at one end to a port 151 of the relay valve shown in Fig. 9, which has a port 157 communicating through a conduit 221 with the forward end of a brake cylinder 222 provided with a piston 223 connected to the brake rigging of the trailer. The rear end of the brake cylinder is connected to the reservoir 214 by means of a conduit 225 which also communicates through a conduit 226 with a bore 152 of the relay valve.

The relay valve herein employed comprises a valve housing formed of two sections 146 and 147 secured together upon the marginal edge of a diaphragm 148 which divides the interior of the housing into two chambers 149 and 150. The chamber 149 is provided with the port 151 adapted to be connected to the conduit 220 whereby the chamber 149 normally contains a vacuum. The housing section 147 is provided with the axial bore 152 which is reduced at 153 and enlarged at 154, the reduced bore 153 terminates in the chamber 150 and the larger bore 154 has a threaded sleeve 155 adapted to be connected to the vacuum reservoir 214 and to the rear end of the brake cylinder 222 by means of the conduits 226 and 225. Lateral ports 156 and 157 terminate in the bore 152, and the port 156 is closed by a breather or air cleaner 158, while the port 157 is adapted to be connected to the conduit 221 leading to the forward end of the brake cylinder 222.

Mounted reciprocally in the bore 152 is a piston type valve 160 secured to the diaphragm 148 which is held in the position shown in Fig. 9 by means of a spring 161. Extending longitudinally of the piston is a bore 162 communicating at one end with the enlarged bore 154 and at the opposite end with lateral ports 163 at all times communicating with the chamber 150 so that the latter is always in communication with the source of suction. Spaced about the piston 160 are annular closure or valve members 165 and 166 which define therebetween a recess 167 at all times in communication with the atmospheric port 156.

In order to provide air tight seals with respect to the bore 152 and the piston 160, a cup-shape packing 170 is disposed about the piston 160 and has its annular depending flange 171 beveled and extending toward the atmospheric port 156 whereby air which might leak past the closure 165 will distend the flange 171 into air tight engagement against the bore 153 and prevent passage of air to the chamber 150. Additional packing or sealing rings 172 and 173 are disposed in the bore 154, the sealing ring 172 being engaged by the closure member 166 when the relay valve is in off position to prevent leakage of air to the brake cylinder port 157, and when the relay valve is in applied position the closure member 166 presses against the sealing or packing ring 173 to prevent leakage of air to the vacuum port and thereby maintain the high degree of vacuum required to hold the trailer brake in applied position.

When the relay valve is in off position the diaphragm 148 is submerged in vacuum and is held in the position shown in Fig. 9 by means of spring 161. Upon moving the control valve to brake applying position, air is immediately admitted to the diaphragm chamber 149 which subjects diaphragm 148 to a differential pressure and moves the latter and the piston 160 to the right as viewed in Fig. 9 to place the brake cylinder port 157 in communication with the breather 158 to thereby subject the forward end of the piston 233 to atmospheric pressure which causes the piston 222 to move to the right as viewed in Fig. 10 and apply the trailer brakes.

In order to release the trailer brakes the control valve is moved to the release position which again connects the diaphragm chamber 149 to the source of suction through the control valve to balance diaphragm 148 in vacuum, and the brake cylinder port 157 is again in communication with the vacuum reservoir, whereby the brake cylinder piston 223 is suspended in vacuum.

Should the trailer separate from the tractor then the relay valve will automatically operate in the manner just described. And when in brake applied position the packing ring 173 prevents air from leaking therepast to the vacuum cylinder to thereby maintain the desired vacuum at the rear of the brake cylinder 222 to insure continued trailer brake application.

I have found that if a leak occurs in the tractor brake system and if at the same time the automobile engine cannot supply a degree of suction that will overcome the leak then the leaking air predominates over the suction and applies the tractor and trailer brakes without warning. This accidental braking occurs if the check valves are maintained open solely by means of the vacuum in the brake system and when the degree of vacuum is low the check valves close automatically and accordingly the leaking air is not absorbed by the automobile motor but accumulates in the brake conduits and eventually overcomes the suction in the now closed brake conduit and applies the brakes without warning.

In order to overcome this objectionable operation I have provided a check valve 230, herein shown, installed in the conduits 204 and 215, and is provided with a valve disc 231 normally held against a spider 232 in open position by means of a spring 233. If a leak occurs in the tractor braking system the latter is at all times in communication with the automobile engine since the check valve 230 in the conduit 204 remains open and accordingly the leaking air is drawn off due to the suction provided by the automobile engine. The check valve in the conduit 215 also remains open and should the manifold suction fail to absorb the leaking air then the vacuum in the reservoir 214 will supply the required degree of suction to overcome the leaking air and hold the brakes in release position.

If the trailer separates from the tractor then the check valve in the conduit 215 is automatically closed due to atmospheric pressure overcoming the pressure of the spring 233 whereby atmosphere is prevented from entering the reservoir 214 and the trailer is not depleted of vacuum supply.

Referring to Figs. 8 and 10 the numeral 240 designates a metering valve of suitable construction which can be adapted to control the amount of air to be admitted to the forward end of the brake cylinder 200 when the control valve is operated. Under some conditions, upon operation of the control valve, the tractor brakes are applied prior to the actuation of the relay valve to operate the trailer brakes and this causes the so-called "jackknifing" of the tractor trailer unit. That is the trailer has a tendency to telescope the tractor. I have found that by employing the metering valve 240 I can restrict passage of air through the conduit 205 and delay the operation of the brake cylinder 200 as desired, without interfering with the usual operation of the relay valve.

Figs. 11 and 12 illustrate a foot control valve for controlling a vacuum suspended power cylinder for actuating a hydraulic master brake cylinder, and lost motion means for manually operating the master cylinder in case the vacuum power fails or becomes deficient. Numeral 250 indicates a vacuum suspended power cylinder having one end connected to a pipe 251 which is joined to a connector 252 communicating with a pipe 253 connected to the intake manifold of a motor vehicle. A pipe 254 connects the forward end of the power cylinder 250 with the brake port of a control valve 255 hereinafter described. In order to operate a trailer brake system, not shown, we have connected to the pipe 254 a conduit 256 leading to the trailer brakes. A piston 258 disposed in the power cylinder has a rod 259 connected to the lower end of a lever 260 fulcrumed as at 261 to a rod 262 carried on the motor vehicle. Intermediate the fulcrum point 261 and the piston rod 259, the lever has pivotally connected thereto a plunger 263 of a hydraulic master cylinder 264 having a conduit system 265 not completely shown leading to the wheel brakes of the motor vehicle. The master cylinder 264 is carried by a bracket 266 secured to the rod 262.

The upper end of the lever 260 is pivotally connected to a rod 269 secured to a lost motion mechanism 270 comprising an elongated yoke 271 the arms 272 of which are provided with an elongated slot 273 to slidably receive a pin 274 which pivotally supports a pair of links 275 arranged to slide along the inner surface of the yoke arms 272 for a distance determined by the length of the slots 273. The forward ends of the links 275 are connected to a rod 276 pivotally connected at its forward end to a brake pedal 278 fulcrumed at 279. The rear ends of the links 275 are pivoted to the upper end of a valve actuating lever 280 pivotally supported intermediate its ends by a pin 281 pivotally carried by the arms 272 of the yoke 271. The lower end of the lever 280 is pivoted to a valve rod 282 loosely disposed in an axial port 283 of a plunger 284 forming part of the control valve 255.

The control valve shown in Fig. 11 comprises a housing made in two sections 291 and 292. The section 291 is provided with an axial bore 293 for the sliding reception of the plunger 284 about which is a packing 294 and a boot 295 to provide a substantially air tight seal therebetween. The housing section 292 and its component parts are similar to the valve housing 51 and its enclosed structure as shown in Fig. 3 with the exception that the bore 57 communicates with the source of suction through the connector 252 instead of the manifold port 62 which may be closed by a removable plug. The breather 296 is shown herein mounted on the dash board of the motor vehicle and is connected by means of a conduit 297 to the atmospheric port 60 of the control valve. If desired the breather may be threaded directly to the valve housing.

In operation assume that the internal combustion engine is operating and creating a partial vacuum in the pipe line 253 it will be obvious that the power cylinder piston 258 will be submerged in vacuum since one side of the piston is exposed to vacuum by means of the connector 252 and pipe 251, while the other side of the piston is exposed to vacuum through the connector 252, bore 57, brake port 61 and pipe 254. The diaphragm 77 is also submerged in vacuum, one side of the diaphragm communicating with the source of suction through the ports 75, passage 74, and bore 57, while the other side of the diaphragm is exposed through the passage 64, brake port 61 and bore 57. When it is desired to apply the brake, pressure is exerted on the brake pedal 278 causing the links 275 of the lost motion device to move relative to the yoke 271, thereby moving the pin 274 longitudinally of the slots 273 and at the same time causing the valve operating lever 280 to swing on its fulcrum 281 against the tension of the valve spring 72 and move the plunger 284 so that the latter moves the diaphragm 77 and piston valve 65 to a position wherein the closure valve 66 is at the right of the brake port 61, as viewed in Fig. 11, cutting off the source of suction to the diaphragm chamber 56 and to the front end of the power cylinder 250. When the closure valve 66 is in this brake applied position atmosphere enters through the breather 296 to the annular recess 68 to the brake part 61 so that atmospheric pressure is created in the diaphragm chamber 56 and also at the left hand side of the piston 258 to cause the latter to move to the right. Creating of atmospheric pressure in the diaphragm chamber 56 subjects diaphragm 77 to a differential pressure of vacuum on one side and atmosphere at the opposite side which resists the brake applying movement of the valve lever 280 and consequently the brake pedal 278 through the links 275 and rod 276. And since the diaphragm chamber 56 is in communication with the left side of the power cylinder 250 the opposing resistance exerted by the diaphragm 77 against the pedal 278 will be a direct increment of the extent of atmospheric pressure existing at the left side of the piston 258, thereby accurately apprising the operator of the exact amount of power being exerted on the brake mechanism by the power actuator. Movement of piston 258 to the right causes the lever 260 to fulcrum at 261 and push the hydraulic piston 263 into the master cylinder 264 to distribute the hydraulic fluid to the wheel brake cylinders and apply the brakes. This swinging movement of the lever 260 causes yoke 271 to move in the direction of the pedal and relative to the links 275 so that the control valve 255 will follow the pedal thereby restoring the lost motion connection to its original position. Upon release of pressure on the brake pedal the piston valve will be returned to normal position by the spring 72, and the piston 258 and diaphragm 77 will again be submerged in vacuum.

Should differential pressures fail to be created in the power actuator 250 for any reason, continued movement of the pedal 278 in the direction of brake application will cause the pin 274 to bottom in the slots 273 after taking up the lost motion and thereby exert a direct pull from the brake pedal to the top of the lever 260 which will then fulcrum about 261 and force the hydraulic piston 263 into the master cylinder 264, whereby the pressure exerted on the hydraulic piston 263 is applied solely by the physical force of the operator.

It will be understood that various changes in the size, shape and arrangement of parts may be resorted to without departing from the spirit of the invention or the scope of the appended claims.

I claim:

1. In a power actuated brake system, a valve comprising a housing having a high pressure port connected to a source of high pressure a low pressure port connected to a source of low pressure and a brake port connected to a brake cylinder to operate the brakes, a diaphragm in said housing for separating said housing into two pressure chambers, valve means having a passage to at all times communicate one of said chambers with said low pressure port, said valve means being operable when in one position to communicate said brake port with said low pressure port to automatically subject said diaphragm to the variable pressures in the brake cylinder, means for at all times communicating the other of said chambers with said brake port, and operating means for moving said valve means to another position to communicate said high pressure port with said brake port.

2. In a power actuated brake system, a valve comprising a housing having a high pressure port connected to a source of high pressure a low pressure port connected to a source of low pressure and a brake port connected to a brake cylinder for actuating the brakes, a plunger having spaced annular closures for controlling communication of said low pressure port and said high pressure port with respect to said brake port, said spaced closures defining a recess providing a passage between one of said pressure ports and said brake port, a diaphragm connected to said plunger, means defining a passage for exposing one side of said diaphragm to the pressure at the other of said pressure ports, and means defining a passage for exposing the other side of said diaphragm to the pressure in said brake cylinder.

3. In a power actuated brake system, a valve housing having a high pressure port connected to a source of high pressure a low pressure port connected to a source of low pressure and a brake port connected to a brake operating cylinder, a diaphragm in said housing for separating said housing into two chambers, valve means connected to said diaphragm and having a passage to at all times communicate one of said chambers with said low pressure port, means for at all times communicating the other of said chambers with said brake port, said valve means when in one position establishing communication between said brake port and said low pressure port, hand controlled valve operating means including a spring acting on said diaphragm, and cam means for compressing said spring to move said diaphragm and valve means to another position to connect said high pressure port with said brake port.

4. In a power actuated automobile brake, a valve housing having a high pressure port connected to the atmosphere a low pressure port connected to a source of low pressure and a brake port connected to a brake cylinder; a diaphragm in said housing for separating said housing into two chambers, a valve body means connected to said diaphragm and having a passage to at all times communicate one of said chambers with said low pressure port, said valve body when in one position establishing communication between said brake port and said low pressure port; means for at all times communicating the other of said chambers with said brake port; foot operated means for moving said valve body to another position to connect said atmospheric port with said brake port; and spring means disposed in said other chamber for acting on said diaphragm to oppose the pedal pressure.

5. In a vacuum brake system for motor vehicles including a tractor and trailer and having a source of suction, a power actuator for each vehicle connected to said source of suction, a brake mechanism on each vehicle operated by its respective power actuator, a main control valve on the tractor, and an auxiliary valve on the trailer, conduit means connecting said source of suction with said auxiliary valve, a check valve housing disposed in said conduit means and providing an axial bore communicating with said conduit means, a valve disposed in said bore, and spring means for normally maintaining said valve unseated against the action of suction in said conduit means, said valve having such an area exposed to the fluid in said conduit means as to be operated by atmosphere entering said axial bore to effect seating of said valve.

6. In a power actuated brake system, a valve housing having a bore, a valve plunger therein, said bore having a high pressure port, a low pressure port and a brake cylinder port communicating therewith, said bore and housing terminating at one end in an enlarged diaphragm compartment, a diaphragm in said compartment separating it into inner and outer chambers, means for securing the diaphragm to the end of said plunger, spring means for normally urging said plunger to a position causing said brake cylinder port to communicate with one of said other ports, means for at all times communicating one of said chambers with the low pressure port, means for at all times communicating the other chamber with said brake cylinder port, and said valve plunger being movable to alternately communicate the brake cylinder port with said other ports to apply and release the brake.

7. In a power actuated brake system, a valve comprising a housing having a bore, a valve plunger therein, said bore having a high pressure port, a low pressure port and a brake cylinder port, said bore and housing terminating at one end in an enlarged diaphragm compartment, a diaphragm in said compartment for separating it into inner and outer chambers, said valve plunger having a pair of reduced portions providing separated spaces communicated by a passage, one of said reduced portions of the valve plunger communicating with the inner diaphragm chamber, said valve plunger being operable when in one position to communicate said brake port with said low pressure port, means for at all times communicating the other of said diaphragm chambers with said brake port, and operating means for moving said valve means to another position to communicate said high pressure port with said brake port.

8. In a power actuated brake system, a valve comprising a housing having a high pressure port connected to a source of high pressure, a low pressure port connected to a source of low pressure and a brake port connected to a brake cylinder for actuating the brakes, a plunger having spaced annular closures for controlling communication of said low pressure port and said high pressure port with respect to said brake port, said spaced closures defining a recess providing a passage which opens communication between either one or the other of said pressure ports and said brake port, a diaphragm connected to said plunger, and said plunger having a constantly open passage from said recess communicating with one side of the diaphragm in all positions of the plunger.

GERHARD C. R. KUIPER.